Patented Aug. 17, 1937

2,090,173

UNITED STATES PATENT OFFICE 2,090,173

DIPHENYL DERIVATIVES AND A PROCESS OF PREPARING THEM

Karl Zahn and Kurt Schimmelschmidt, Frankfort-on-the-Main, Germany, assignors to General Aniline Works, Inc., New York, N. Y., a corporation of Delaware No Drawing. Application June 14, 1932, Serial No. 617,260. In Germany June 24, 1931

7 Claims. (Cl. 260—130.5)

Our present invention relates to new diphenyl derivatives and to a process of preparing them; more particularly it relates to compounds of the following general formula:

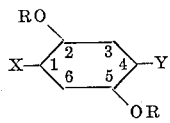

wherein X stands for a radical of the benzene series, R for alkyl or aralkyl and Y for hydrogen, a nitro- or an amino-group.

We have found that the nitration of 2,5-dialkoxy-diphenyls or their substitution products, being unsubstituted in the 4-position, occurs in an easy way and in a very good yield with the formation of mononitro-2,5-dialkoxy-diphenyls which may be converted into amino-2,5-dialkoxy-diphenyls by reducing them in the usual manner, by means of hydrogen, for example, in the presence of a catalyzer, iron, zinc and tin in the presence of acids, aluminium-amalgam, sodium hydrosulfide (NaSH), etc. This result could in no way be foreseen; it had rather to be expected that, according to the knowledge gained in the nitration of diphenyl (cf., for instance, "Ind. and Eng. Chem." vol. 22, [1930], page 31; "Journal of Chem. Soc.", London, 1926, page 1239), in an unsymmetrical diphenyl, in the simplest case a 2,5-disubstituted diphenyl, the nitro-group would enter the 2'-, 4'-, 4- or 6-position. Probably, the new compounds correspond with the constitution of 4-nitro-, and 4-amino-2,5-dialkoxy-diphenyls, respectively:

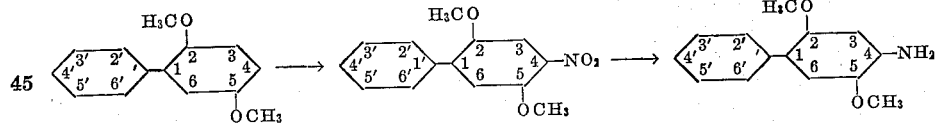

In an analogous manner there are obtained from diphenyls substituted in 2,5-position by aralkyloxy-groups the 4-nitro-2,5-diaralkyloxy-diphenyls and the corresponding 4-amino-diphenyls.

The ethers of 2,5-dihydroxy-diphenyls, used as starting materials, may be prepared by reducing the phenyl-quinones obtainable in an easy way according to the statements in the U. S. Patent No. 1,735,432 (cf. Borsche, "Annalen der Chemie", vol. 312 [1900], page 221) and etherifying in the usual manner the phenyl-hydroquinones thus obtained.

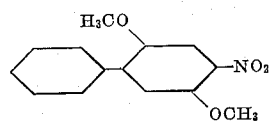

The 4-amino-2,5-disubstituted-diphenyls and their substitution products, obtainable according to the present process are valuable intermediate products for the manufacture of dyestuffs.

The following examples serve to illustrate the invention, but they are not intended to limit it thereto, the parts being by weight, unless otherwise stated; the relationship between parts by weight and parts by volume is that which exists between a kilogram and a liter:

(1) According to this example 4-nitro-2,5-dimethoxy-diphenyl of the following formula

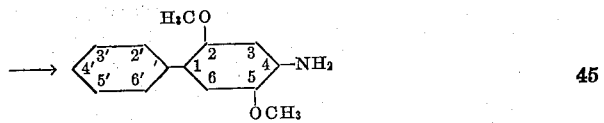

is obtained:

214 parts of 2,5-dimethoxy-diphenyl (melting at 42° C., boiling at 180° C. under a pressure of 10 mm. Hg) are triturated with 250 parts by volume of glacial acetic acid; to this mixture there are added, without cooling, 75 parts by volume of nitric acid of specific gravity 1.4. The nitration takes place with excessive self-heating;

on cooling, the reaction mixture solidifies to a thick crystalline magma. The nitro-compound is freed from the mother liquor by filtering with suction and by subsequent washing with methanol. After drying, 230 to 240 parts of a yellow product, melting at 101° C. to 103° C., are obtained. By recrystallizing the crude product from glacial acetic acid, yellow needles are obtained which melt at 102° C. to 103° C.; hence it follows that the crude product is already pure and uniform. According to the analysis a mononitro-dimethoxy-diphenyl has been obtained. (Content of nitrogen; calculated 5.41, found 5.64).

The same product is obtainable by treating 2,5-dimethoxy-diphenyl in the ball mill with 3 times its weight of nitric acid of specific gravity 1.2.

(2) According to this example 4-amino-2,5-dimethoxy-diphenyl of the following formula:

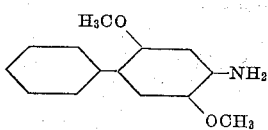

is obtained:

In a horizontal autoclave provided with a stirrer there are treated with hydrogen gas, under pressure, 259 parts of 4-nitro-2,5-dimethoxy-diphenyl and 1000 parts by volume of alcohol in the presence of a nickel catalyzer, precipitated on pumice stone (i. e. 2.5 to 5 grams of active nickel). The reduction occurs with excessive self-heating. When the absorption of hydrogen is finished, the content of the autoclave is freed from the catalyzer by filtering with suction while hot and the solution of the base obtained is caused to crystallize by cooling. By concentrating the mother liquor, further quantities of crystallized product are obtained. 200 to 210 parts of a crude product in the form of white leaflets, melting at 89° C., are obtained. The melting point of the base cannot be raised by recrystallization from which it follows that the base is pure. The alcoholic solution of the reduction product may also be worked up in such a manner that the alcohol is distilled off and the remaining base is distilled in vacuo.

(3) By replacing in Example (1) 2,5-dimethoxy-diphenyl by 242 parts of 2,5-diethoxy-diphenyl (boiling at 175° C. to 190° C. under a pressure of 8 mm. Hg) 4-nitro-2,5-diethoxy-diphenyl of the melting point 92° C. is obtained. By reducing this nitro-compound, 4-amino-2,5-diethoxy-diphenyl, melting at 72° C. to 73° C. is obtained.

(4) By replacing in Example (1) 2,5-dimethoxy-diphenyl by 244 parts of 2,5,4'-trimethoxy-diphenyl (melting at 62° C. to 64° C.), 4-nitro-2,5,4'-trimethoxy-diphenyl, melting at 106° C., is obtained. The catalytical reduction of this nitro compound yields 4-amino-2,5,4'-trimethoxy-diphenyl, melting at 125° C. to 126° C.

(5) 290 parts of 2,5-dimethoxy-terphenyl (2,5-dimethoxy-4'-phenyl-diphenyl), melting at 157° C. to 158° C., (obtainable by condensation of benzoquinone with para-diphenyl-diazonium-chloride so as to form diphenyl-benzoquinone, melting at 190° C. to 191° C., reduction to the hydroquinone, i. e. the 2,5-dihydroxy-terphenyl of the melting point 171° C. to 172° C., and methylation of this compound with dimethylsulfate in an alkaline solution) are triturated with 1500 parts by volume of glacial acetic acid; to this mixture there are added 75 parts by volume of nitric acid of specific gravity 1.4. Thereupon, the suspension is warmed until the whole dissolves to a clear solution. After cooling, the precipitated nitro-compound is filtered with suction, covered with glacial acetic acid and washed with water until neutral. There are obtained 280 to 290 parts of 4-nitro-2,5-dimethoxy-terphenyl in the form of yellowish-brown crystals which melt at 159° C. to 161° C. The nitro-compound may be reduced in the usual manner to form the 4-amino-2,5-dimethoxy-terphenyl (4-amino-2,5-dimethoxy-4'-phenyl-diphenyl) which crystallizes from chlorobenzene in the form of needles, melting at 213° C. to 214° C., and which corresponds to the following formula:

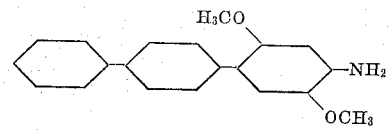

(6) 298 parts of 2,5-dibutoxy-diphenyl (boiling at 200° C. under a pressure of 10 mm. Hg) are introduced drop by drop, while stirring, at a temperature below 0° C. into 1000 parts by volume of nitric acid of specific gravity 1.4. Thereby, the nitro compound formed crystallizes even partly from the reaction mixture. When the reaction is finished, the precipitation of the nitro compound is completed by introducing the whole into 2000 parts by volume of ice-water and the new product is isolated by filtering with suction and washing with water until neutral. The product is freed from small quantities of resin-like substances adhering to it by making it into a paste with 400 parts by volume of ice-cold methyl-alcohol, filtering it with suction and washing it with cold methyl alcohol. The 4-nitro-2,5-dibutoxy-diphenyl obtained crystallizes from methyl-alcohol in the form of yellow needles which melt at 41° C. to 42° C. By reducing this nitro-compound, 4-amino-2,5-dibutoxy-diphenyl is obtained, melting at 52° C. to 53° C.

(7) 250 parts of 2,5-dimethoxy-3'-chlorodiphenyl (melting at 43° C. to 44° C.) are dissolved in 500 parts by volume of glacial acetic acid. 75 parts by volume of nitric acid of specific gravity 1.4 are run into this solution, while well cooling. The nitration takes place at once with excessive self-heating and the reaction mixture solidifies to a crystalline magma. The nitro-compound is freed from the mother liquor by filtering with suction and washing with methanol. 250 parts of 4-nitro-2,5-dimethoxy-3'-chlorodiphenyl are obtained in the form of yellow needles which melt at 127° C. By reducing this nitro-compound, 4-amino-2,5-dimethoxy-3'-chloro-diphenyl, melting at 68° C. to 69° C. is obtained.

(8) 283 parts of 2,5-dimethoxy-3',5'-dichloro-diphenyl (melting at 104° C. to 107° C.) are dissolved in 600 parts by volume of glacial acetic acid and, after the mixture has been allowed to cool, 60 parts by volume of fuming nitric acid (of 96% strength) are gradually added thereto, while well cooling. The nitro-compound separates at once in the form of crystals and is freed from the mother liquor by filtering with suction and washing with methanol. 280 parts of 4-nitro-2,5-dimethoxy-3',5'-dichloro-diphenyl, melting at 149° C. to 150° C., are obtained. By reducing this nitro-compound, 4-amino-2,5-dimethoxy-3',5'-dichloro-diphenyl, which melts at 161° C. to 163° C., is obtained.

The following table indicates a number of further compounds which are likewise obtainable according to the present process:

| | Parent material | Nitro-compound | Amino-compound |
|---|---|---|---|
| (1) | 2,5-dimethoxy-4'-methyl-diphenyl, melting at 66° C. to 67° C. | 4-nitro-2,5-dimethoxy-4'-methyl-diphenyl at 167° C. | 4-amino-2,5-dimethoxy-4'-methyl-diphenyl, melting at 103° C. to 104° C. |
| (2) | 2,5-dimethoxy-2'-methyl-diphenyl, melting at 74° C. to 75° C. | 4-nitro-2,5-dimethoxy-2'-methyl-diphenyl, melting at 86° C. to 87° C. | 4-amino-2,5-dimethoxy-2'-methyl-diphenyl, melting at 116° C. to 117° C. |
| (3) | 2,5-dimethoxy-2'-chloro-diphenyl, boiling at 180° C. under a pressure of 8 mm. Hg. | 4-nitro-2,5-dimethoxy-2'-chloro-diphenyl, melting at 132° C. to 134° C. | 4-amino-2,5-dimethoxy-2'-chloro-diphenyl, melting at 131° C. to 132° C. |
| (4) | 2,5-dimethoxy-4'-chloro-diphenyl, melting at 63° C. to 64° C. | 4-nitro-2,5-dimethoxy-4'-chloro-diphenyl, melting at 152° C. to 153° C. | 4-amino-2,5-dimethoxy-4'-chloro-diphenyl, melting at 101° C. to 102° C. |
| (5) | 2,5-dimethoxy-4'-benzoyl-amino-diphenyl, melting at 148° C. to 149° C. | 4-nitro-2,5-dimethoxy-4'-benzoyl-amino-diphenyl, melting at 187° C. | 4-amino-2,5-dimethoxy-4'-benzoyl-amino-diphenyl, melting at 150° C. |
| (6) | 2,5-dimethoxy-3',4'-dichloro-diphenyl, melting at 58° C. to 59° C. | 4-nitro-2,5-dimethoxy-3',4'-dichloro-diphenyl, melting at 137° C. | 4-amino-2,5-dimethoxy-3',4'-dichloro-diphenyl, melting at 113° C. |
| (7) | 2,5-dimethoxy-2',4'-dichloro-diphenyl, boiling at 195° C. under a pressure of 8 mm. Hg. | 4-nitro-2,5-dimethoxy-2',4'-dichloro-diphenyl, melting at 125° C. to 127° C. | 4-amino-2,5-dimethoxy-2',4'-dichloro-diphenyl, melting at 100° C. |
| (8) | 2,5-dibenzyloxy-diphenyl, melting at 98° C. to 100° C. | 4-nitro-2,5-dibenzyloxy-diphenyl, melting at 136° C. to 138° C. | 4-amino-2,5-dibenzyloxy-diphenyl, melting at 117° C. to 119° C. |
| (9) | 2,5-dimethoxy-3'-(ω-trifluormethyl-)diphenyl, boiling at 167° C. under a pressure of 8 mm. Hg. | 4-nitro-2,5-dimethoxy-3'-(ω-trifluormethyl-)diphenyl, melting at 139° C. to 140° C. | 4-amino-2,5-dimethoxy-3'-(ω-trifluormethyl-)diphenyl, melting at 67° C. to 68° C. |
| (10) | 2,5-dimethoxy-2',4'-dimethyl-diphenyl, boiling at 178° C. under a pressure of 8 mm. Hg. | 4-nitro-2,5-dimethoxy-2',4'-dimethyl-diphenyl, melting at 126° C. to 127° C. | 4-amino-2,5-dimethoxy-2',4'-dimethyl-diphenyl, melting at 99° C. to 100° C. |
| (11) | 2,5,4'-trimethoxy-2'-chloro-diphenyl, boiling at 205° C. under a pressure of 8 mm. Hg. | 4-nitro-2,5,4'-trimethoxy-2'-chlorodiphenyl, melting at 132° C. to 133° C. | 4-amino-2,5,4'-trimethoxy-2'-chloro-diphenyl, melting at 112° C. to 113° C. |
| (12) | 2,5,4'-trimethoxy-3'-chloro-diphenyl, boiling at 220° C. under a pressure of 8 mm. Hg. | 4-nitro-2,5,4'-trimethoxy-3'-chlorodiphenyl, melting at 127° C. to 128° C. | 4-amino-2,5,4'-trimethoxy-3'-chloro-diphenyl, melting at 101° C. to 103° C. |
| (13) | 2,5-dimethoxy-4'-chloro-2'-methyl-diphenyl, boiling at 190° C. under a pressure of 8 mm. Hg. | 4-nitro-2,5-dimethoxy-4'-chloro-2'-methyl-diphenyl, melting at 150° C. to 151° C. | 4-amino-2,5-dimethoxy-4'-chloro-2'-methyl-diphenyl, melting at 106° C. |
| (14) | 2,5,2'-trimethoxy-5'-methyl-diphenyl, melting at 98° C. to 100° C. | 4-nitro-2,5,2'-trimethoxy-5'-methyl-diphenyl, melting at 112° C. to 113° C. | 4-amino-2,5,2'-trimethoxy-5'-methyl-diphenyl, melting at 107° C. to 108° C. |
| (15) | 2,5-dimethoxy-2',4',5'-trichloro-diphenyl, boiling at 205° C. under a pressure of 8 mm. Hg. | 4-nitro-2,5-dimethoxy-2',4',5'-trichloro-diphenyl, melting at 156° C. to 157° C. | 4-amino-2,5-dimethoxy-2',4',5'-trichloro-diphenyl, melting at 126° C. to 127° C. |
| (16) | 2,5-dimethoxy-3',4',5'-trichloro-diphenyl, melting at 104° C. to 106° C. | 4-nitro-2,5-dimethoxy-3',4',5'-trichloro-diphenyl, melting at 190° C. to 191° C. | 4-amino-2,5-dimethoxy-3',4',5'-trichloro-diphenyl, melting at 175° C. to 176° C. |
| (17) | 2,5,2',5'-tetramethoxy-4'-chloro-diphenyl, melting at 126° C. to 127° C. | 4-nitro-2,5,2',5'-tetramethoxy-4'-chloro-diphenyl, melting at 187° C. to 190° C. | 4-amino-2,5,2',5'-tetramethoxy-4'-chloro-diphenyl, melting at 175° C. to 179° C. |
| (18) | 2,5,2',4'-tetramethoxy-5'-chloro-diphenyl, melting at 114° C. to 115° C. | 4-nitro-2,5,2',4'-tetramethoxy-5'-chloro-diphenyl, melting at 192° C. to 193° C. | 4-amino-2,5,2',4'-tetramethoxy-5'-chloro-diphenyl, melting at 148° C. to 149° C. |
| (19) | 2,5-dibutoxy-3'-chloro-diphenyl, boiling at 220° C. under a pressure of 8 mm. Hg. | 4-nitro-2,5-dibutoxy-3'-chloro-diphenyl, melting at 60° C. | 4-amino-2,5-dibutoxy-3'-chloro-diphenyl, fluid, forming a well crystallizing chlorohydrate. |
| (20) | 2,5-dimethoxy-3'-methyl-diphenyl, boiling at 170° C. under a pressure of 8 mm. Hg. | 4-nitro-2,5-dimethoxy-3'-methyl-diphenyl, melting at 114° C. | 4-amino-2,5-dimethoxy-3'-methyl-diphenyl, fluid, forming a well crystallizing chlorohydrate. |
| (21) | 2,5-diethoxy-3'-methyl-diphenyl, boiling at 178° C. under a pressure of 8 mm. Hg. | 4-nitro-2,5-diethoxy-3'-methyl-diphenyl, melting at 75° C. to 76° C. | 4-amino-2,5-diethoxy-3'-methyl-diphenyl, fluid, forming a well crystallizing chlorohydrate. |
| (22) | 2,5,2'-trimethoxy-diphenyl, boiling at 192° C. to 193° C. under a pressure of 8 mm. Hg. | 4-nitro-2,5,2'-trimethoxy-diphenyl, melting at 114° C. to 116° C. | 4-amino-2,5,2'-trimethoxy-diphenyl, fluid, forming a well crystallizing chlorohydrate. |
| (23) | 2,5-dimethoxy-3'-methyl-sulfonyl-diphenyl, boiling at 260° C. under a pressure of 8 mm. Hg. | 4-nitro-2,5-dimethoxy-3'-methyl-sulfonyl-diphenyl, melting at 192° C. | 4-amino-2,5-dimethoxy-3'-methyl-sulfonyl-diphenyl, fluid, forming a well crystallizing chlorohydrate. |
| (24) | 2,5-dimethoxy-2',5'-dichloro-diphenyl, boiling at 195° C. under a pressure of 8 mm. Hg. | 4-nitro-2,5-dimethoxy-2',5'-dichloro-diphenyl, melting at 147° C. to 148° C. | 4-amino-2,5-dimethoxy-2',5'-dichloro-diphenyl, fluid, forming a well crystallizing chlorohydrate. |
| (25) | 2,5-dimethoxy-5'-chloro-2'-methyl-diphenyl, boiling at 185° C. under a pressure of 8 mm. Hg. | 4-nitro-2,5-dimethoxy-5'-chloro-2'-methyl-diphenyl, melting at 110° C. to 111° C. | 4-amino-2,5-dimethoxy-5'-chloro-2'-methyl-diphenyl, fluid forming a well crystallizing chlorohydrate. |

We claim:

1. The process which comprises nitrating diphenyl compounds of the following general formula:

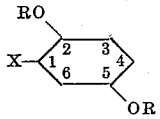

wherein X stands for a radical of the group consisting of phenyl, chloro-phenyl, methyl-phenyl, methoxy-phenyl, diphenyl, benzoylamino-phenyl, methylsulfonyl-phenyl and omega-trifluoromethyl-phenyl, and R for a radical of the group consisting of benzyl and alkyl of the lower aliphatic series, and reducing the 4-nitro-diphenyl compounds obtained to the corresponding 4-amino-diphenyl compounds.

2. The process which comprises nitrating 2,5-dimethoxy-diphenyl of the following formula:

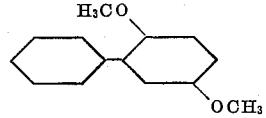

and reducing the 4-nitro-2,5-dimethoxy-diphenyl obtained to the corresponding 4-amino-2,5-dimethoxy-diphenyl.

3. The compounds of the following general formula:

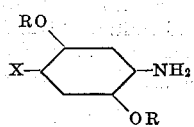

wherein X stands for a radicle of the group consisting of phenyl, chloro-phenyl, methyl-phenyl, methoxy-phenyl, and diphenyl, and R for a radicle of the group consisting of benzyl and alkyl of the lower aliphatic series, being colorless, partly solid, partly fluid compounds which form well crystallized chlorohydrates and which can be easily diazotized.

4. The compound of the following formula:

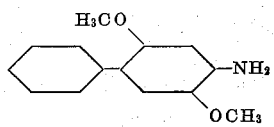

crystallizing from alcohol in the form of colorless leaflets of the melting point 89° C.

5. The compound of the following formula:

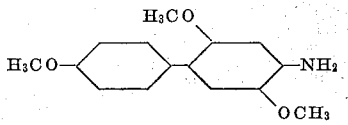

melting at 125° C. to 126° C.

6. The process which comprises nitrating diphenyl compounds of the following general formula:

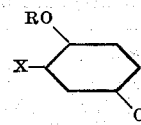

wherein X stands for a radical of the benzene series and R for a radical of the group consisting of benzyl and alkyl of the lower aliphatic series, and reducing the 4-nitro-diphenyl compounds obtained to the corresponding 4-amino-diphenyl compounds.

7. The compounds of the following general formula:

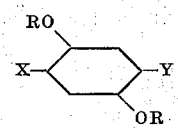

wherein X stands for a radical of the benzene series, R for a radical of the group consisting of benzyl and alkyl of the lower aliphatic series, and Y for a member of the group consisting of nitro and amino.

KARL ZAHN.
KURT SCHIMMELSCHMIDT.